(12) United States Patent
Kofman et al.

(10) Patent No.: US 6,230,073 B1
(45) Date of Patent: May 8, 2001

(54) COMPUTERIZED FOODSTUFFS IMAGING PROCESS AND APPARATUS

(75) Inventors: Leonid M. Kofman, Brooklyn; Christopher J. Hill, Bellmore; Sigfried Stiber, Freeport; Ilya L. Miller; Yuriy D. Chernov, both of Brooklyn, all of NY (US)

(73) Assignee: Chocolate Printing Company, Inwood, NY (US)

( * ) Notice: Subject to any disclaimer, the term of this patent is extended or adjusted under 35 U.S.C. 154(b) by 0 days.

(21) Appl. No.: 09/419,669

(22) Filed: Oct. 15, 1999

Related U.S. Application Data

(60) Provisional application No. 60/160,154, filed on Oct. 29, 1998.

(51) Int. Cl.[7] ............ G06F 19/00; A23L 17/10; A23P 1/00
(52) U.S. Cl. ............ 700/204; 426/87; 426/383; 118/13
(58) Field of Search ............ 700/204; 426/87, 426/383; 118/13

(56) References Cited

U.S. PATENT DOCUMENTS

| | | | |
|---|---|---|---|
| 4,168,662 | 9/1979 | Fell | 101/492 |
| 4,455,320 | 6/1984 | Syrmis | 426/383 |
| 4,531,292 | * 7/1985 | Pasternak | 33/18.1 |
| 4,548,825 | 10/1985 | Voss et al. | 426/383 |
| 4,578,273 | 3/1986 | Krubert | 426/87 |
| 4,668,521 | 5/1987 | Newsteder | 426/87 |
| 4,843,958 | 7/1989 | Egosi | 101/2 |
| 4,905,589 | 3/1990 | Ackley | 101/35 |
| 4,910,661 | 3/1990 | Barth et al. | 700/66 |
| 4,979,720 | * 12/1990 | Robinson | 249/103 |
| 5,162,119 | 11/1992 | Pappas et al. | 425/92 |
| 5,407,691 | * 4/1995 | Przelomski et al. | 426/249 |
| 5,505,775 | 4/1996 | Kitos | 118/14 |
| 5,795,395 | 8/1998 | Ben-Matitayhu et al. | 118/712 |
| 5,800,601 | 9/1998 | Zou et al. | 106/31.65 |
| 5,834,047 | 11/1998 | Ahn | 426/383 |
| 5,895,682 | * 4/1999 | Tsukioka | 426/383 |
| 5,898,591 | * 4/1999 | Hettinga et al. | 700/204 |
| 5,992,742 | * 11/1999 | Sullivan et al. | 235/462.01 |

* cited by examiner

Primary Examiner—William Grant
Assistant Examiner—Sheela S. Rao
(74) Attorney, Agent, or Firm—St. Onge Steward Johnston & Reens LLC

(57) ABSTRACT

An apparatus for printing an image on a generally non-absorbent surface of a food item selected from the group consisting of chocolate, cheese and the like or a combination thereof includes a computer allowing an operator to create a unique template for the food item. The apparatus further includes software adjusting a scanned image to the created template and a production line controllably operating a process of making the food product that corresponds to the template. Also, the apparatus has a means for treating the surface of the food item so as to directly print the image on its non-absorbent surface.

24 Claims, 6 Drawing Sheets

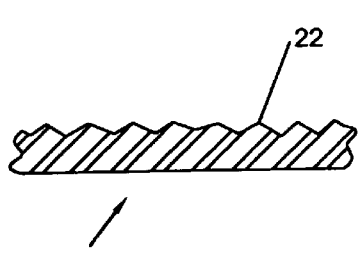
FIG. 4
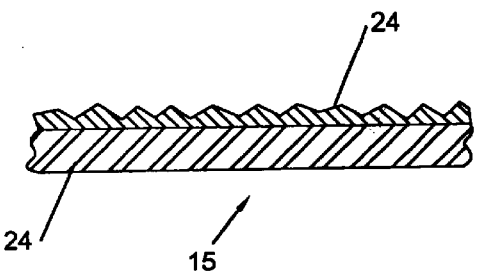
FIG. 5
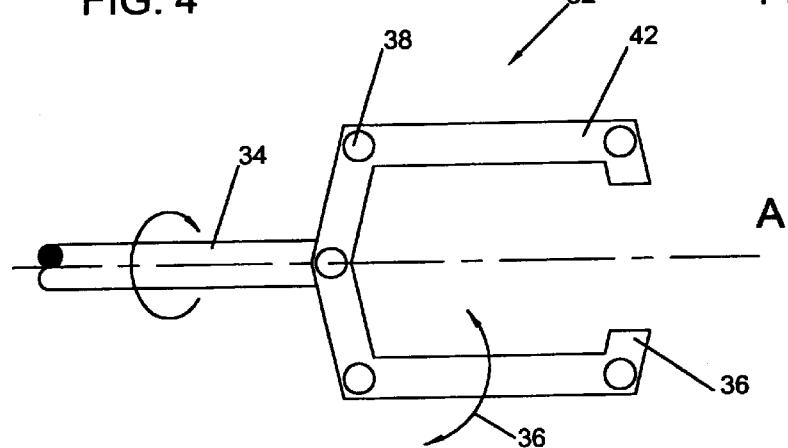
FIG. 6
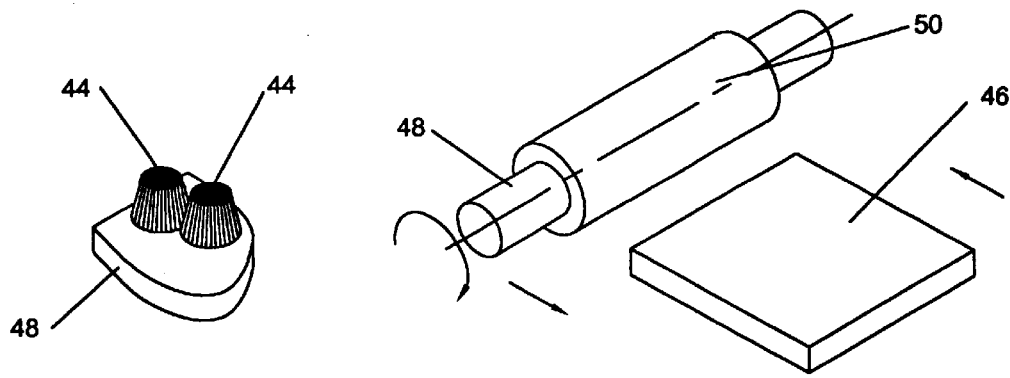
FIG. 7
FIG. 8

COMPUTERIZED FOODSTUFFS IMAGING PROCESS AND APPARATUS

PRIOR APPLICATION

This application is a continuation in part of the U.S. provisional patent application No. 60/160,154 filed Oct. 29, 1998 and fully incorporated herein.

FIELD OF THE INVENTION

The invention relates to an apparatus for reproducing an image onto foodstuffs, such as chocolates, cheese, or the like. Particularly, the invention relates to an apparatus, and the method of its usage, for printing any pictorial representation desired for reproduction upon the surface of any related type of aforementioned items with edible ink.

BACKGROUND OF THE INVENTION

The application of decorative means to various foodstuffs, such as the surface of a cake, essentially derived over the years as an individual craft of the artisans skilled efforts in providing personalized decorations to such components. For example, early ornamentations provided to cakes, cookies and related types of foodstuffs, fairly well depend upon the skill, dexterity, and imagination of the baker, in order to get any facsimile of decoration upon the finished food product.

Various substitutes to skilled artisans have by necessity been devised for use for decorating food products, and, recently, automated systems for cake decoration have appeared on the market which allow decorating on an automatic basis. For example, U.S. Pat. No. 5,834,047 to Ahn relates to a process of imprinting diverse shapes of multiple colors inside the confectionery products with edible ink. An edible mixture of confectionery material is filled and solidified in a mold which is pressed upon by a plurality of etching plates of a predetermined shape and according to predetermined colors. The mold is rotated with a predetermined angle and number of times to disperse edible ink more than once with different colors on the surface of the solidified confectionery material. Since shapes and color combinations can be too complicated, this process may be time consuming and may be difficult to implement on the hard surface of opaque food items, such as chocolate.

U.S. Pat. No. 5,505,775 to Kitos discloses another cake decorating system, wherein a digitally stored image is transferred to the top of a cake using a print head that includes a drop-on-demand ink expulsion system which has a nozzle plate directing edible ink toward the cake's surface. This system relies on the accurate alignment and rigidity of the three-axis system to preserve image fidelity. Any departure from perpendicularity, particularly in the x and z-directions, and any play in the mutual alignment of the head supporting arm and the slide assembly supporting the cake, is reflected in a noticeable deterioration in the quality of the picture on the surface of the cake.

U.S. Pat. No. 5,795,395 to Ben-Matitayhu et al., discloses an apparatus for decorating a cake by providing a movable printing head that dispenses edible ink at positions corresponding to the pixels of a digital image. The head and the cake are displaceable relative to one another by means of a leveling mechanism, which includes adjustable legs supporting the cake supporting table. Since the head is displaceable only laterally, it is easier to keep an arm supporting the head than is the case with the above-discussed patent to Kitos. While both these methods achieve satisfactory results with products having porous surfaces, it may not be applicable to hard-surface items because the hard surface should be specifically treated so as to be able to contain edible ink.

U.S. Pat. No. 4,578,273 discloses a method of forming a food product by providing a hard, non-porous icing surface on a baked product upon which an image is imprinted. However, it may be difficult to use a jet printing method on the icing surface because edible ink may spread around this icing surface, if the latter is not properly thermally treated.

U.S. Pat. No. 4,668,521 to Newsteder discloses a typical process of forming an image on chocolate. The method includes a step of forming a photoengraving metal plate coated with an insoluble photo-etch material. The transparency bearing a halftone image of the original is placed over the plate and is exposed to ultraviolet light so as to record the halftone image on the plate's surface. After treating the plate with an acid and allowing it to dry, highlighted and shadow areas representing the halftone image is clearly discernable. The method further provides casting a screen against the plate so as to transfer the true image on a chocolate. This method requires manufacturing molds and screens and may not achieve satisfactory results of transferring the image on chocolate.

It is therefore desirable to provide an apparatus for jet printing an image directly onto a generally non-absorbent hard surface of chocolate without manufacturing additional molds and screens. Also, it is desirable to provide an apparatus of the type described above that is capable of providing high definition imaging transfer onto a non-absorbent surface of a food item. An apparatus that provides simple and reliable alignment between an item and a printing head is also desirable, as is a method for transferring an image on a hardened generally non-absorbent surface that can be automated.

SUMMARY OF THE INVENTION

This is achieved by an automated system enabling the transfer of any pictorial representation onto a generally non-absorbent surface of a food item, particularly a chocolate item, by scanning the representation and jet-printing edible ink directly onto this surface. The automated system may include software executing on a computer which is programmed to control a printer provided with edible ink.

The automated system has software executing on the computer for automatically selecting a size and shape of a prototype of chocolate items. It further has a means for scanning an image and adjusting the image on the prototype, according to which a mold is selected or made.

The automated system may further automatically control a temperature in a heater and displacement of the filled mold along a conveyor delivering the mold through a cooling station towards a preparation station. According to the invention, the preparation station may have an automatically controlled gripping mechanism adapted to separate the hardened food item from the mold. This gripping mechanism may controllably turn the food item at a 180° angle so as to position the separated product on a movable product stabilizer.

Preferably, the product stabilizer is comprised of a movable surface formed with a plurality of formations, each corresponding to a particular shape and size of the preselected food item. The movable surface is controllably displaceable to place the top surface of food items in the same predetermined horizontal plane, although these items may have the different overall thickness. This aspect of the invention is significant because very few adjustments have to be made between a printing head and the stop surface to be printed upon during image printing.
}

In another aspect of the invention, the automatic system further includes a surface preparation system that is controllably positioned to treat the hard surface of the food item so as to prepare it for subsequent image printing. The surface preparation system is controllably displaceable relative to the food item to mechanically treat this top surface during a predetermined time, which is a function of the preselected size and shape of the food item.

Preferably, the surface preparation system, in accordance with invention, is comprised of rotatable brushes arranged to have their orbits overlap one another so as to cover the entire surface of the food item. Yet a linearly displaceable roller formed with a textured surface that controllably treats the top layer of the food item is also contemplated by the invention.

According to a further aspect of the invention, the automatic system also has a jet printer having a protective member that prevents a printing head from contacting the top surface of the item. The protective member can be a mechanical screen juxtaposed with the printing head or it can be a system of sensors generating warning signals, in response to which a desirable distance between the head and the top surface is controllably maintained.

It is therefore an object of the invention to provide an automated production system capable of jet-printing a pictorial representation directly onto a generally non-absorbent surface of a food item.

Still another object of the invention is to provide an automated system for controllably treating a surface of a food item, upon which an image is to be printed in accordance with a shape and size of the preselected food item.

A further object of the invention is to provide an automated system for automatically placing a food item so as to have its top surface fixed in a predetermined position with respect to a printing head the jet printer.

Yet another object of the invention is to provide an automated system for automatically creating a variety of shapes and sizes of a food item.

Another object of the invention is to provide an automated system for controllably operating a jet printer, which is programmed to automatically transfer a preselected image on the top surface of a food item by means of edible ink.

Another object of the invention is to provide a method of automatically operating a production line for preparing a food item.

Still another object is to provide a method for designing a food item having specific shape and size and for adjusting an image on the designed food item so as to jet print the image on its hardened surface.

BRIEF DESCRIPTION OF THE DRAWINGS

FIG. 4 is a cross-sectional view of a bottom of a mold.

FIG. 5 is a cross-sectional view of a bottom of a mold provided with a textured layer.

FIG. 6 is a diagrammatic view of a gripper.

FIG. 7 is a diagrammatic view of one embodiment of a surface treating apparatus.

FIG. 8 is a diagrammatic view of another embodiment of a surface treating apparatus.

FIG. 9 is an isometric view of another embodiment of a food item carrier.

DETAILED DESCRIPTION OF THE DRAWINGS

Figure 1:
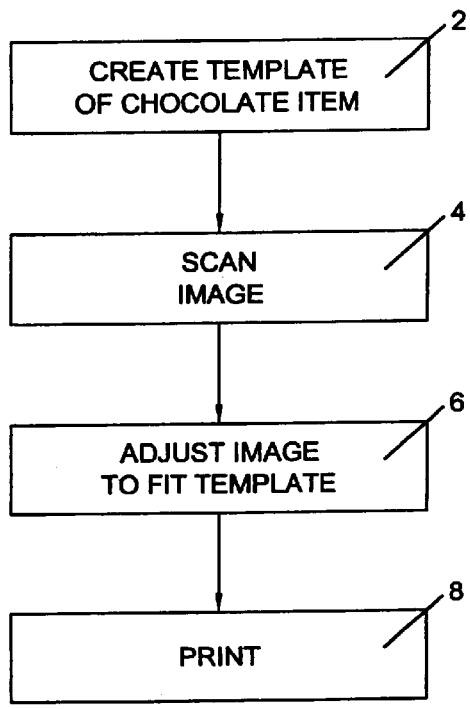
FIG. 1 is a flow chart of a process in accordance with the invention.
Figure 2:
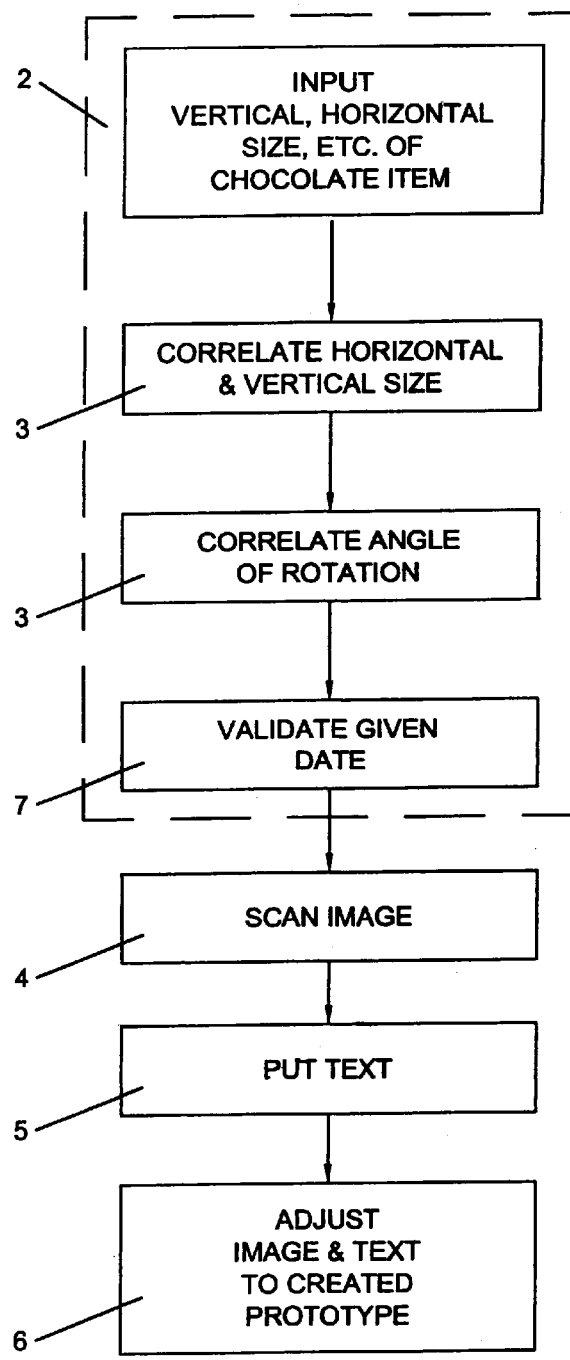
FIG. 2 is a more detailed flow chart of a step of creating a prototype of the food item according to a process of FIG. 1.

Referring to FIG. 1, one of the preferred embodiments of the invention, shown by way of a flow chart, achieves the above-stated objects by printing a pictorial image, a verbal statement or a combination thereof directly on a hard, generally non-absorbent surface of a food item. Particularly, an operator using software creates a prototype of a chocolate product at 2. The chocolate product can have different shapes, forms and sizes. An algorithm, shown in FIG. 2 and allowing an operator to correlate horizontal and vertical size of the prototype at 3 as well as an angle of rotation at 5, can do this. Upon completion of the prototype, all necessary data is both validated and stored in database 7.

Having created a template of the chocolate item, the operator scans an image 4 to be printed on a chocolate's hardened surface, and further adjusts a size thereof at 6 so it can fit the previously created prototype. Alternatively, the prototype of the chocolate item still may be modified to fully fit the desirable image. In addition to adjusting the image, the operator may further add a text 5, a position of which can also be adjusted.

Once the operator is satisfied with the created design, a signal is sent to a printer to enable it to print the image with edible ink on a real chocolate item that has been manufactured according to the created prototype, as will be now explained with reference to FIG. 3.

Figure 3:
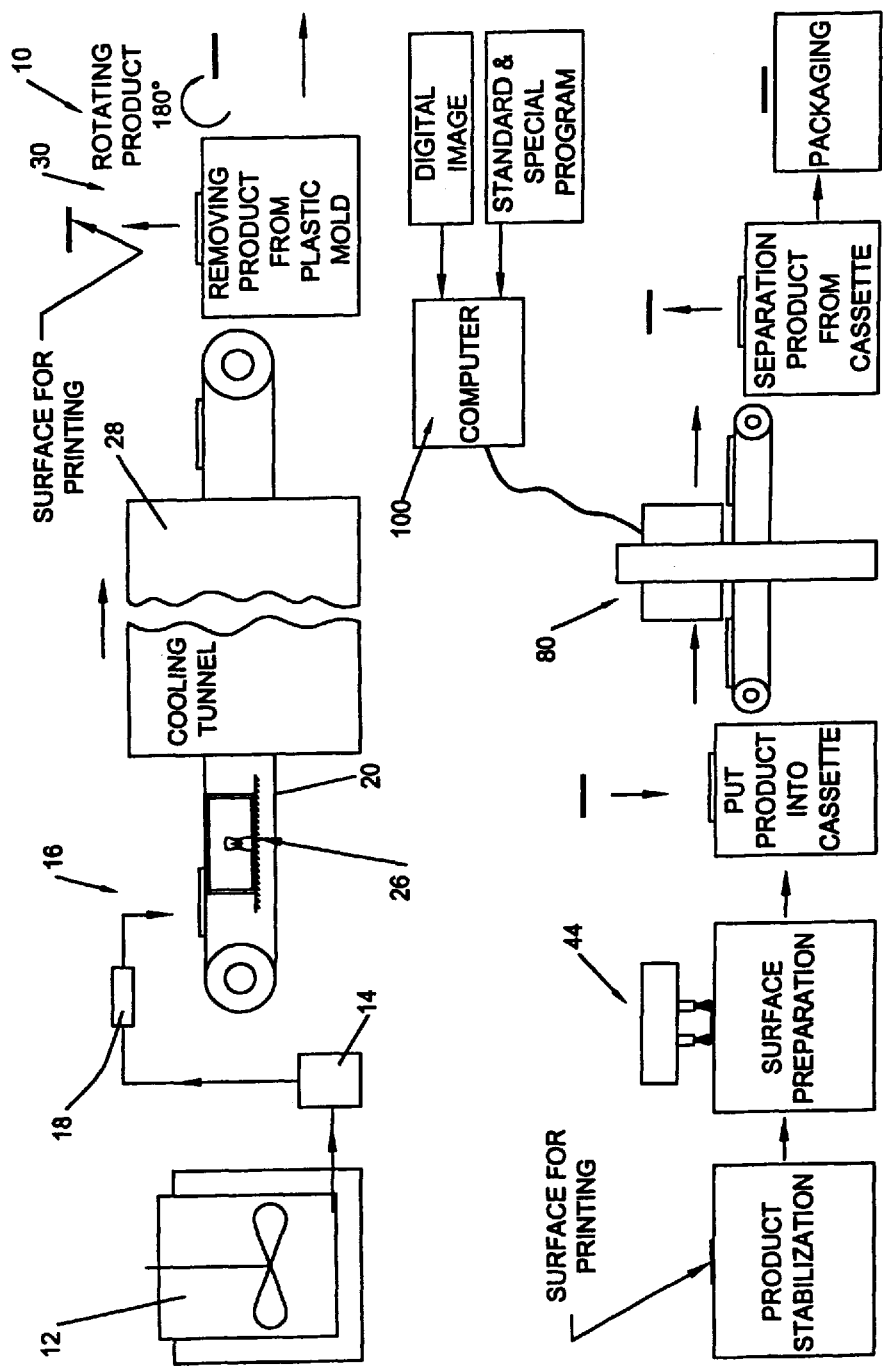
FIG. 3 is a diagrammatic view of a technological production line of a process of FIG. 1.

Particularly, FIG. 3 illustrates a process of manufacturing a chocolate item. If a manufacturing facility is relatively small and primarily serves individual customers, some of the process steps may be manually performed. However, if a manufacturing facility is geared to mass production, the process may be automated. In accordance with the invention, a production line has a certain sequence of operations characteristic to both partly automated and automated processes, as illustrated in FIG. 3.

Referring to FIG. 3, an automated system 10 in accordance with the invention is generally shown and includes a few stations collectively defining a production line of a product, preferably a chocolate product. Particularly, a heater heats chocolate mass that has undergone blending, refining, conching, tempering and cooling stages, as known in the art, approximately to a temperature which is at least 92° F. The heater basically includes a reservoir 12 filled with chocolate mass that is treated by an agitator 14. The properly conditioned mass is then delivered by a pump 14 to a distribution station 16 that pours it into a mold 15 that has been formed according to the computer-created prototype. It is understood that a chocolate item may have a variety of shapes including customized shapes and standard ones. This variety of shapes and sizes of customized molds 15 is limited only by technological capabilities and requirements of a facility and may include irregular, polygonal, star-like and etc. Rectangular, circle or/and oval shape can be considered to be standard.

A small operation facility may rather use a manual step of filling the mold by utilizing visual control allowing a user to selectively turn on the pump 14. However, it is contemplated within the scope of this invention to automatically control the work of a measuring device 18 and the pump as a function of the mold's volume, quantity of similar molds and frequency at which each mold is delivered to the filling station. The measuring device 18 may be equipped with a controllably operating filling means which can be selectively open for predetermined time in response to a signal received from a central processor unit (hereinafter CPU) 100. Specifically, an electronic counter turning the pump 14 off in response to reaching a predetermined count measured by a control circuit of the CPU 100 in response to the known volume of the mold, can be an example of a controlling system monitoring automated filling of the mold.

Upon filling the mold 15, it is placed on a continuous conveyor 20. In accordance with one aspect of the invention as shown in FIG. 4, each mold has its bottom 22 textured so as to apply a slight degree of unevenness to the chocolate's surface facing this bottom. Alternatively, the mold's bottom may be substantially flat and be covered by a removable layer 24 which, as shown in FIG. 5, has its surface textured analogously to the mold's bottom shown in FIG. 4. Amplitude of peaks formed on this textured surface may not exceed a fraction of a millimeter.

Returning to FIG. 3, to improve conformity of the chocolate mass with the selected mold, the system, as known in the prior art, has a vibrator 26 operatively connected with the endless conveyor 20. Advantageously, the conveyor 20 extends through a cooling tunnel 28 where the chocolate mass is cooled approximately to a temperature of 50–60° F. After gradually bringing the cooled chocolate mass to an ambient temperature, preferably to 85–91° F., the chocolate product is delivered to a preparation station 24, generally shown in FIG. 3.

The above-discussed steps can be manually controlled by periodically turning on the vibrator and the conveyor, which can be suitable for a small manufacturing facility. Alternatively, it also may be fully automated and controlled by the CPU 100 so a speed of conveyor can be calculated and controlled as a function of a particular shape, material and volume of the mold 15 as well as specifics of chocolate mass. Further, the conveyor's speed can be a function of a rate at which both, the mold and the chocolate mass, cool down. Since the cooling step is followed by removing the chocolate from the mold, as will be explained hereinbelow, it is of utmost importance to know a precise moment of time when the cooled chocolate item can be easily removed from the mold.

Once the chocolate product has been cooled down to a desirable temperature, it has to be removed from the mold since a surface mostly suitable for further treatment is the one that faces the bottom 22 of the mold 15. Similarly to previously described operations, the mold may be manually rotated at a 180° to allow the chocolate product to slip down from the plastic mold 15. Preferably, however, as shown in FIG. 6, this operation is automated by utilizing a gripper 32 including a horizontal rod 34 and generally U-shaped arms 36 which are articulated on the rods by means of joint 38 to rotate about an axis A—A. The arm may have a pair of jaws 42 displaceable about the joints 38 in a direction of an arrow 40 so as to adjust a grip to a different shapes and diameters of the mold 15. The jaws may be manufactured to have a shape corresponding to any shape of the mold, or may have multiple parts displaceable relative to one another to conform to variously shaped molds. In case of the multi-part jaws, it is conceivable to have a control circuit of the CPU 100, receiving information including a shape and size of the mold 15, that automatically displaces the jaws 42 relative to each other. Once the mold is received between the jaws, the arms 36 rotate at a 180° angle to separate the product from the mold.

In accordance with another aspect of the invention, the preparation station further includes a surface treatment apparatus that may have different designs. Characteristic to all possible implementations of such treatment apparatus is the concept of treating a top layer of the product so as to allow specifically designed edible ink to accurately and properly adhere to the product.

Specifically, according to one embodiment of such apparatus as shown in FIG. 7, brushes 44 have overlapping orbits so as to cover the entire surface of the product 46 upon their rotation about parallel axes. Once again, a motor (not shown here) actuating these brushes or a single brush can be turned on and off manually. Advantageously, the motor automatically controlled by the CPU 100 is turned on for a period of time which is sufficient to satisfy requirements applied to a surface and which is typically selected and maintained based on an empirical data. Clearly, a working time period is a function of shape and temperature of the surface.

Still another implementation of the treatment apparatus may be a roll 48 formed with a peripheral surface 50 which is capable of treating the top layer of the product 46 upon displacement of the roller and the product 46 relative to each other, as diagrammatically illustrated in FIG. 8. Also, displacement of this roller in a vertical direction may be automatically controlled to penetrate the top surface at a desirable distance. Optionally, either after or before removing the product 46 on the table 52, it is possible to thermally treat a surface of the food item that has been spaced from the mold's bottom so as to attach it to a differently colored chocolate layer.

Figure 9:
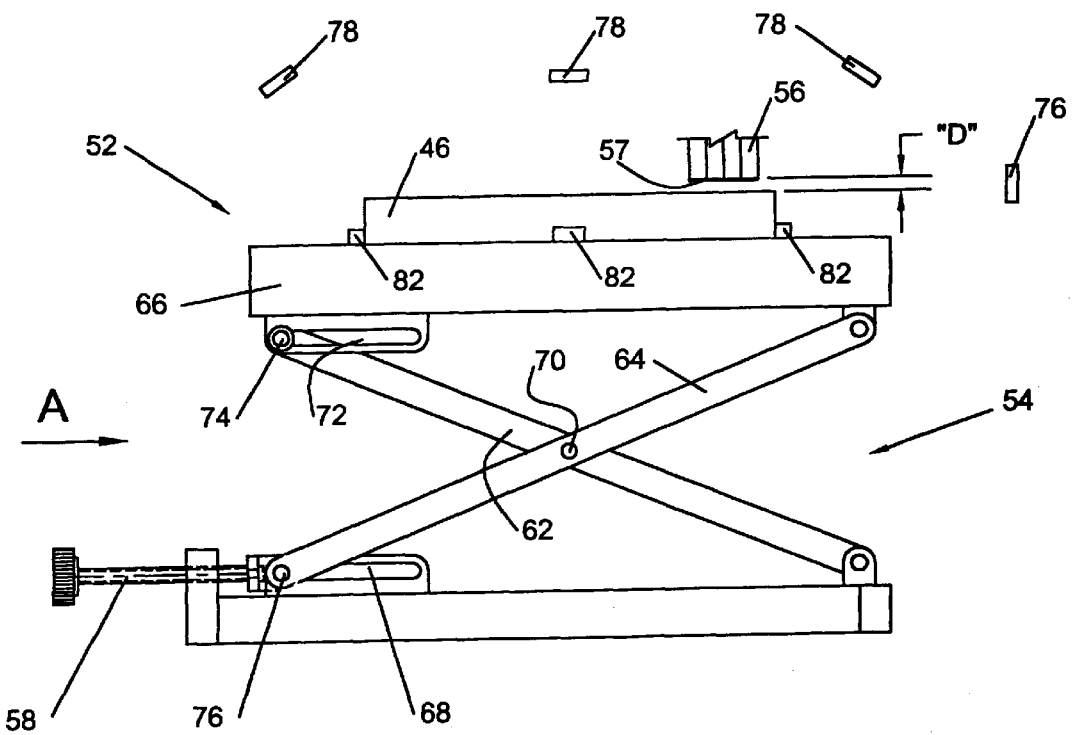
FIG. 9 is a side view of a delivery table carrying a food item to a printing station.
Figure 10:
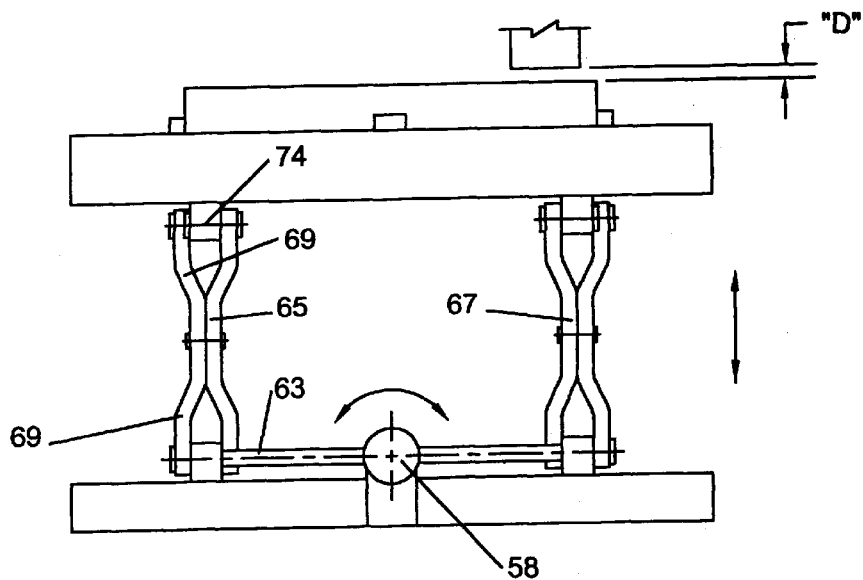
FIG. 10 is a front view of a delivery table shown in FIG. 8.
Figure 16:
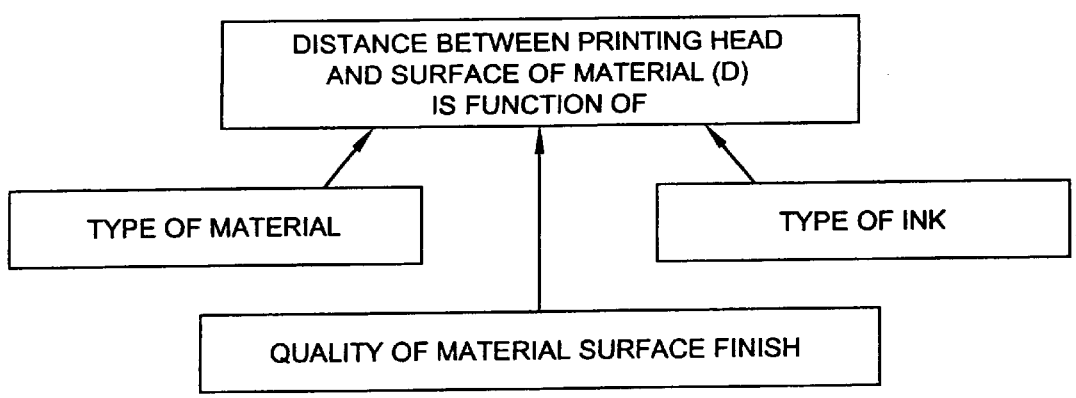
FIG. 16 is a functional representation of an algorithm for calculating distance between a printing head and surface of material.

In accordance with still another aspect of the invention, the product 46 upon its removal from the mold 15 may be placed on a displaceable table 52, as shown in FIGS. 9 and 10. Typically, the product removed from the mold 15 is placed on a continuous conveyor that delivers the item towards a printing station 80 (FIG. 3). Since a distance between a printing head 56 of the printer and the top surface of the chocolate product cannot exceed a few millimeters sufficient to provide a high quality image printing, a problem of controlling this distance becomes critical to a high quality end product. The distance between the printing head and surface of the material is a function of the type of material, the type of ink, and quality of material (FIG. 16).

Obviously, the simplest solution to this problem would be to have the printing head displaceable only in a horizontal plane spaced from the top surface of the product at a uniform fixed distance. In practical terms this is almost impossible to achieve because regardless of how uniform a depth of the mold 15 is, a thickness of products still varies from one mold to another. Thus, this variation in thickness necessitates adjustment of the head.

In order to avoid it, according to another aspect of the invention illustrated in FIGS. 9 and 10, a product is placed on the displaceable table 52 that has a parallelogramatic support 54 providing easy vertical adjustment of the product relative to the printing head 56. Particularly, an actuator 58 displaces a horizontal cross bar 63 simultaneously actuating horizontal displacement of lower ends of legs 65 and 67 that are guided along horizontal guides 68 in a direction A (FIG. 9). Upper ends of the legs are provided with pins 74 which while being guided along a closed path guides 82 simultaneously press against elongated surfaces of the guides so as to raise the support 66 in response to actuation of the lower ends of the legs.

Specifically, each of the legs includes upper and lower U-shaped end portions 69 and two supporting bars 62, 64 forming an X configuration, as shown in FIG. 10. The upper end of the supporting bar 62 is horizontally movable along the guide 72 and displaces the support 66 in a vertical direction synchronously with an upper end of the support 64. Such displacement allows the table to adjust a distance D between the top surface of the product and the printing head which, upon reaching a predetermined value, is detected by a sensor 76.

As is the case with the previously described operations, vertical adjustment of the support may be performed manually by an operator who actuates the actuator 58, which can be, for example, a simple screw. Advantageously, the CPU 100, controllably actuating the screw 58 until the top surface of item 46 reaches a predetermined distance detected by the sensor 76, automatically controls this operation.

As an additional safety measure, the printing head 56 may be provided with a protective screen 57 preventing the head from contacting the top surface of the food item or the position sensor 76 generating a signal that automatically arrests displacement of the table, as explained above.

Since the printer is stationary fixed, it is easy to move the table 52 to a predetermined initial position which is the same for all-possible shapes and forms of the product. Position sensors 78 controlling displacement of a transporting means (now shown here), on which the displaceable table 52 is fixedly mounted, monitor control of this initial position. Once the position is reached, the transporting means is stopped. To even further facilitate centering of the product in a predetermined position, the support 66 has guides or stoppers 82 controllably displaceable to peripherally abut the product 46 in this position. By arresting displacement of the product on the support, positioning of the product relative to the printing head becomes a simple routine.

Figure 11:
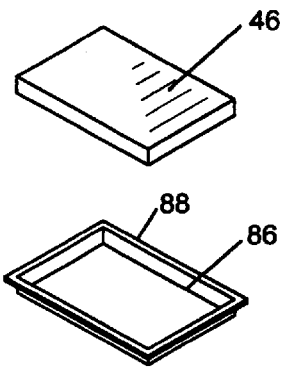
FIG. 11 is an exploded view of a cassette receiving a food item for centering it on a table of FIGS. 9 and 10.
Figure 11:
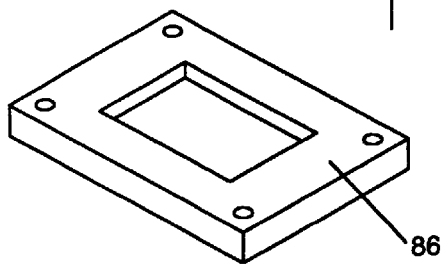
Figure 12:
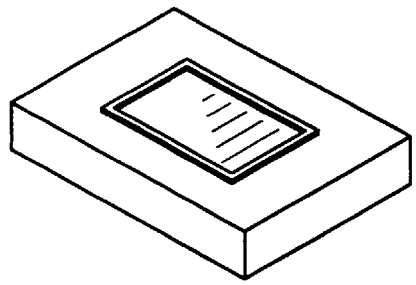
FIG. 12 is an isometric view of a cassette shown in FIG. 11.

The product 46, as described above, can be placed on top of the support 52. However, during printing, the upper surface of the support can be painted by edible ink jetted upon the top surface of the product. To prevent it, the product upon removing from the mold may be placed in a cassette shown if FIGS. 11 and 12. Particularly, the cassette has a base 84 formed with an opening that receives a frame 86 having dimensions corresponding to the product 46. The frame is so shaped that the top surface of the product lies flush or a notch lower than a rim 88 of the frame, which extends laterally outwardly to allow the top surface of the product to be completely open for receiving an image.

Figure 14:
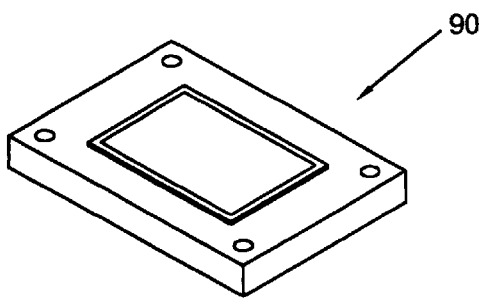
FIG. 14 is an isometric view of the transporting box of FIG. 13.
Figure 13:
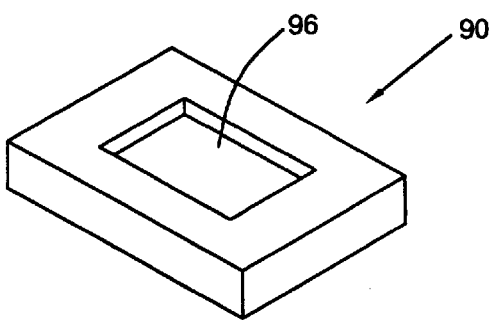
FIG. 13 is an exploded view of a transporting box receiving a ready to be delivered food item.

Upon printing the image, the product can be automatically packaged in a box 90 by (FIGS. 13, 14) initially receiving the product in its opening 96 sized so that a frame 92 is placed between an inner periphery 98 of the opening 96 and the product. The frame is formed with inwardly extending rim 94 protecting the product during transportation.

Figure 15:
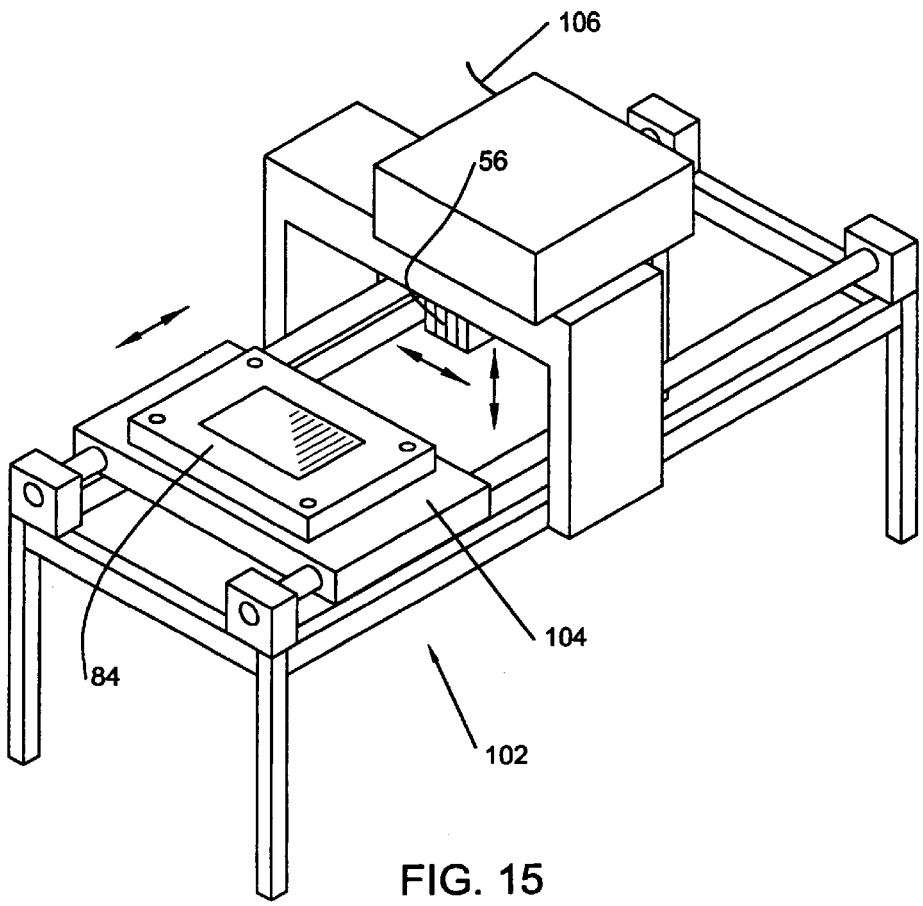
FIG. 15 is an isometric view of another embodiment of a delivery table carrying a food item to a printing station.

According to a further aspect of the invention shown in FIG. 15, the cassette's base 84 can be positioned on a separate support 102 having a controllably movable support 104 that delivers the cassette toward the printing head 56 of a printer 106 provided with an ink delivery system. This delivery system may be provided with a multi-compartment reservoir containing different colors of ink and made of FDA approved materials. In this embodiment, instead of the vertically adjustable table 52, the printing head can be controllably movable in a vertical direction V. However, it is understood, that the above-mentioned table 52 can be easily mounted on the movable support 104 to follow the mode of its operation, as explained in reference to FIGS. 9 and 10.

The embodiments of the invention which have been described are merely illustrative of a few of the applications of the principles of the invention. Although food products described above mainly relate to chocolate products, it is possible to utilize this invention for printing signs or images on any food product having a hardened surface, such as, cheese. Various modifications may be made by an artisan without departing from the scope of the invention, as recited by the following claims.

What is claimed is:

1. An apparatus for printing a visual image on a generally non-absorbent surface of a food item, the apparatus comprising:

a computer;

software executing on the computer for selectively creating a unique prototype of the food item;

software executing on the computer for scanning an image to be printed;

software executing on the computer for adjusting the image on the uniquely created prototype, so as to enable an operator to view an image of the food item with the image printed thereon;

a production technological line operatively connected to the computer for manufacturing the food item the food item having a hardened, generally non-absorbent surface, the food item being shaped and sized in accordance with the prototype; and a printer connected to the computer and provided with software for directly printing the image on the hardened, non-absorbent surface of the food item.

2. The apparatus defined in claim 1 wherein the production line includes a filling station for filling a mold with liquiescent product mass.

3. The apparatus defined in claim 2 wherein the mold has an interior shaped and sized to correspond to the unique prototype, said mold being made of plastic.

4. The apparatus defined in claim 2 wherein the filling station includes a pump controllably operating delivery of the product mass in response to a signal generated by a measuring device.

5. The apparatus defined in claim 4 wherein the measuring device is operatively connected with the computer to generate the signal controllably turning on the pump at a predetermined time in response to data including a shape and volume of the mold.

6. The apparatus defined in claim 5 wherein the measuring device has an electronic counter selectively operating the pump in response to reaching a predetermined count measured by a control circuit of the computer.

7. The apparatus defied in claim 2 wherein the mold has a textured bottom.

8. The apparatus defined in claim 2 wherein the mold is provided with a layer removably placed on a bottom of the mold and having a textured surface.

9. The apparatus defined in claim 2 wherein the production line further includes a continuous conveyor belt receiving the mold and provided with a vibrator, which oscillates the mold as it is transported along a delivery path.

10. The apparatus defined in claim 9 wherein the production line further includes a cooling tunnel extending along the path for gradual solidifying of product mass.

11. The apparatus defined in claim 10 wherein the conveyor is operatively connected with the computer to controllably run along the delivery path so as to provide gradual cooling of the mass with subsequent elevating of the mass temperature up an ambient temperature.

12. The apparatus defined in claim 11 wherein the conveyor advances at a speed controlled by the computer in response to a calculated parameter selected from the group consisting of a shape and size of the mold or a combination thereof.

13. The apparatus defined in claim 11 wherein the conveyor controllably advances at a speed to provide a predetermined rate at which the mass and the mold cool down.

14. The apparatus defined in claim 2 wherein the production line further comprises a treatment station providing surface treatment of the solidified product mass.

15. The apparatus defined in claim 14 wherein the treatment station includes a gripper displaceable to abut the mold and to rotate at a 180° angle so as to remove the product from the mold.

16. The apparatus defined in claim 15 wherein the gripper includes a pair of arms controllably displaceable in response to a signal received from the computer to conform to a shape and size of the mold.

17. The apparatus defined in claim 14 wherein the treatment station further includes at least one rotatable brush, the one brush and the food item being displaceable relative to each other, so that the one brush mechanically treats a surface of the item to prepare it for receiving edible ink.

18. The apparatus defined in claim 14 wherein the treatment station further includes a roller having a textured surface and displaceable parallel to and in contact with a surface of the product to be printed upon.

19. The apparatus defined in claim 2 wherein the production line further includes a displaceable table having a support surface receiving the treated food item and having a parallelogramatic support to displace the support surface at a predetermined distance in a vertical plane.

20. The apparatus defined in claim 19 wherein the support has two legs, each having two diagonally extending arms forming an X configuration, a central joint providing pivotal displacement of the arms relative to each other, and a pair of horizontal guides having closed path recesses which receive lower and upper ends of the arms, respectively.

21. The apparatus defined in claim 20 wherein the recesses receive lower and upper ends of the arms, respectively, and an actuator having a cross bar which simultaneously displaces the lower ends to cause the upper ends to synchronously displace the support surface of the table in the vertical plane.

22. The apparatus defined in claim 19 wherein the production line further includes a plurality of position censors generating a signal corresponding to a predetermined position of the table with respect to the printer and arresting its further displacement in a vertical plane.

23. The apparatus defined in claim 22 wherein the printer includes a printing head provided with a screen preventing direct contact between the printer and the surface to of the food item to be printed upon.

24. A method of printing a visual image on a generally non-absorbent surface of a food item, the process comprising the steps of:

electronically creating a unique template of the food item having a specific shape and size;

scanning a visual image to be printed upon the food item and adjusting the image to the template;

manufacturing a mold corresponding to the created template;

filling the mold with liquiescent product mass;

thermally treating the mass so as the product undergoes gradual cooling and subsequent warming to an ambient temperature;

mechanically treating a surface of the food item to be printed upon; and directly printing the image on a hardened surface of the food item.

\* \* \* \* \*